US008432074B2

(12) United States Patent
Creviston

(10) Patent No.: US 8,432,074 B2
(45) Date of Patent: Apr. 30, 2013

(54) DISK STYLE CENTRIFUGAL PUMP

(75) Inventor: Alex Creviston, Muncie, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 254 days.

(21) Appl. No.: 12/860,976

(22) Filed: Aug. 23, 2010

(65) Prior Publication Data

US 2012/0043836 A1 Feb. 23, 2012

(51) Int. Cl.
*H02K 9/00* (2006.01)

(52) U.S. Cl.
USPC .............................................. 310/54; 310/58

(58) Field of Classification Search .................... 310/52, 310/54, 58, 64
See application file for complete search history.

(56) References Cited

U.S. PATENT DOCUMENTS

| | | | | |
|---|---|---|---|---|
| 7,193,342 B2 * | 3/2007 | Casey et al. | ..................... | 310/58 |
| 2004/0113500 A1 * | 6/2004 | Casey et al. | ..................... | 310/58 |
| 2008/0034730 A1 * | 2/2008 | Filippone | ................... | 60/39.182 |
| 2010/0175377 A1 | 7/2010 | Hippen et al. | | |
| 2011/0001370 A1 * | 1/2011 | Yamada et al. | ................. | 310/54 |

FOREIGN PATENT DOCUMENTS

| | | |
|---|---|---|
| EP | 0013869 | 8/1980 |
| EP | 1841046 | 10/2007 |
| JP | 2009-209725 | * 9/2009 |
| WO | 2005099070 | 10/2005 |

OTHER PUBLICATIONS

Notification of Transmittal of the International Search Report and the Written Opinion of the International Searching Authority, or the Declaration; PCT/US2011/048640; Mar. 19, 2012.

* cited by examiner

*Primary Examiner* — Nguyen N Hanh
(74) *Attorney, Agent, or Firm* — Cantor Colburn LLP

(57) ABSTRACT

An electric machine system includes an electric motor and an oil pump disposed within a housing. The oil pump is configured to disperse oil in a pattern about a rotational axis within the electric motor. A method for operating the electric machine system is also disclosed.

18 Claims, 4 Drawing Sheets

DISK STYLE CENTRIFUGAL PUMP

BACKGROUND OF THE INVENTION

Exemplary embodiments pertain to the art of electric machines and, more particularly, to an electric machine having oil cooling using a disk style centrifugal pump.

Electric vehicles (EVs) or hybrid electric vehicles (HEVs) are gaining in popularity as gas prices increase and consumers have greater awareness of environmental impacts caused by traditional vehicles. Both EVs and HEVs use a traction motor powered by electricity for propulsion to reduce emissions.

During operation, the traction motor generates heat that must be removed to avoid damage to the traction motor. Typically, power electronics used in EVs and HEVs and internal combustion engines used in HEVs are cooled by water. Hence, water may also be considered to directly cool the traction motor. However, oil cooling may be preferred for certain applications as oil provides a thermally efficient and cost effective solution for heat rejection from the internal components of the traction motor. Improving traction motor cooling technology is one path toward enhanced operational efficiency of electric motors.

BRIEF DESCRIPTION OF THE INVENTION

Disclosed is an electric machine system including an electric motor and an oil pump disposed within a housing enclosing the electrical motor. The oil pump is configured to disperse oil in a pattern about a rotational axis within the electric motor.

Also disclosed is a method of operating an electric machine. The method includes rotating a rotating disk spaced a distance D from a stationary disk to draw in oil into a space between the rotating disk and the stationary disk. The method also includes dispersing the oil in a pattern about a rotational axis within the electric motor using a plurality of vanes coupled to the rotating disk.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
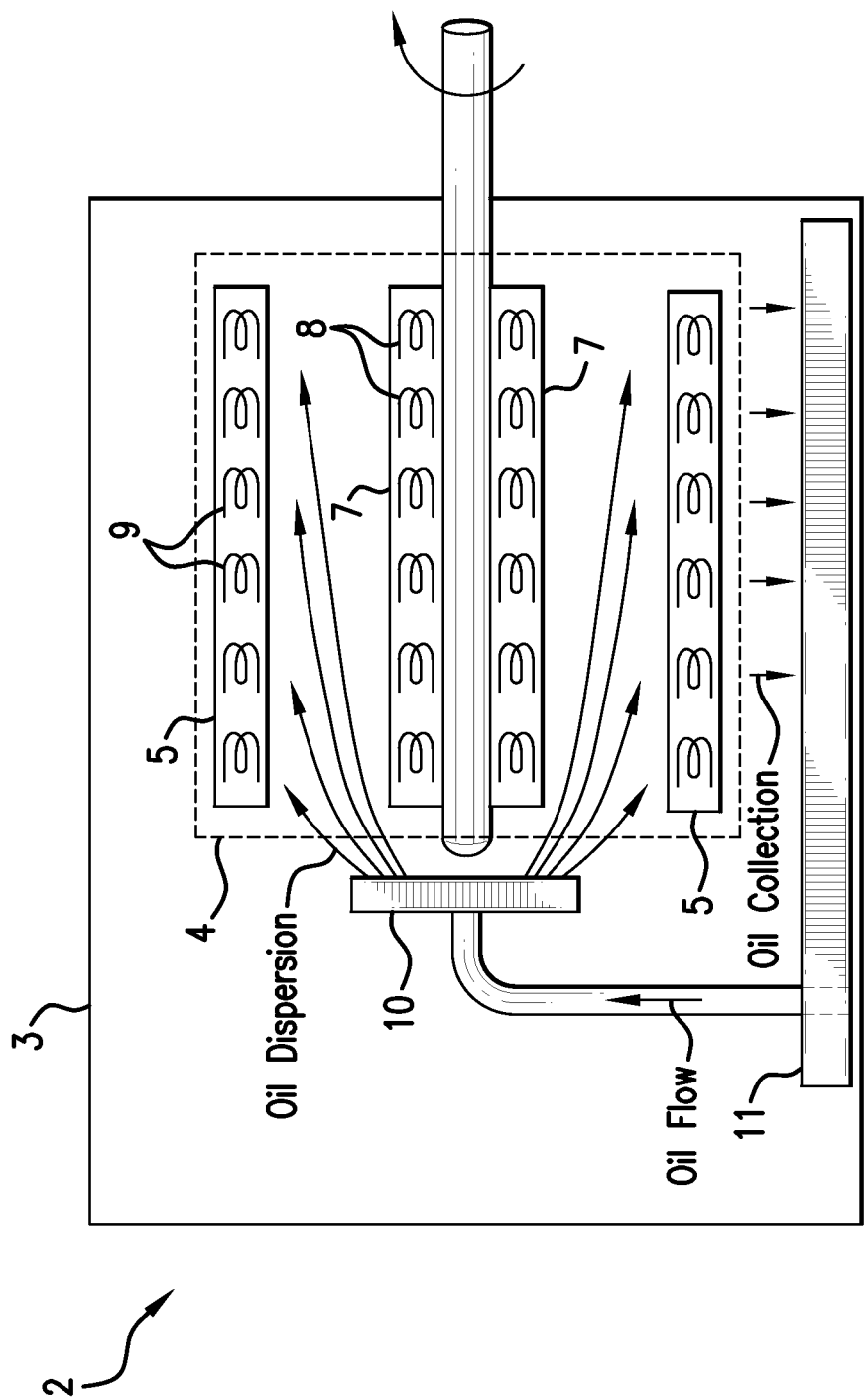
FIG. 1 depicts an electric machine system having an electric machine and an internal cooling oil pump.

An electric machine system in accordance with an exemplary embodiment is indicated generally at 2 in FIG. 1. Electric machine system 2 includes a housing 3. Disposed within the housing 3 is an electric machine, shown in the form of an electric motor 4. The electric motor 4 includes a stator 5 with a plurality of stator windings 6. Internal to the stator 5 is a rotor 7 having a plurality of rotor windings 8 or permanent magnets (also represented by element 8). A rotating magnetic field generated by the stator windings 6 interacts with the rotor windings 8 or the permanent magnets to urge the rotor 7 to rotate.

The electric machine system 2 uses oil as a medium to cool the electric motor 4. In addition, the oil can be used to lubricate and cool rotating components such as the rotor 7. Internal to the housing 3 is an oil pump 10. The oil pump 10 receives oil from an oil sump 11 and disperses the oil in a dispersion pattern to evenly cool the stator 5, the stator windings 6, the rotor 7, and/or the rotor windings 8. In one embodiment, the dispersion pattern is 360 degrees about the longitudinal axis (i.e., rotor axis) of the electric motor 4. The housing 3 defines an enclosed cooling system not requiring external connections for a cooling medium. The enclosed cooling system increases the reliability and lowers the cost of the electric machine system 2.

The oil pump 10 with the oil sump 11 disposed in the bottom of the housing 3 has the benefit that suction at the bottom of housing 3 can help enhance drainage of the oil from the electric motor 4 in the main cavity.

Figure 2B:
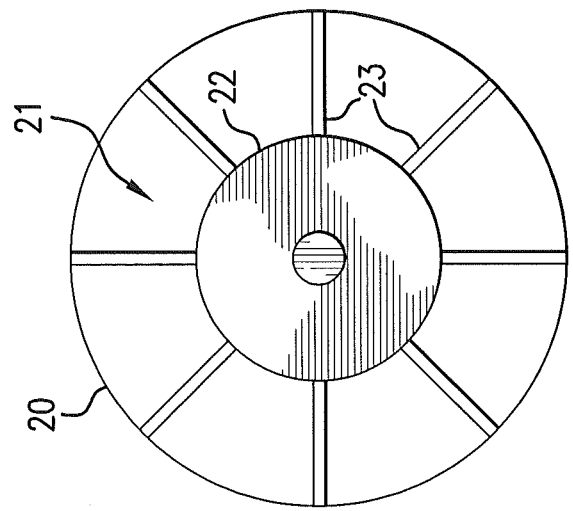
FIGS. 2A and 2B, collectively referred to as FIG. 2, depict aspects of the internal oil cooling pump configured to disperse oil in a 360-degree pattern about a rotational axis within the electric machine.
Figure 2A:
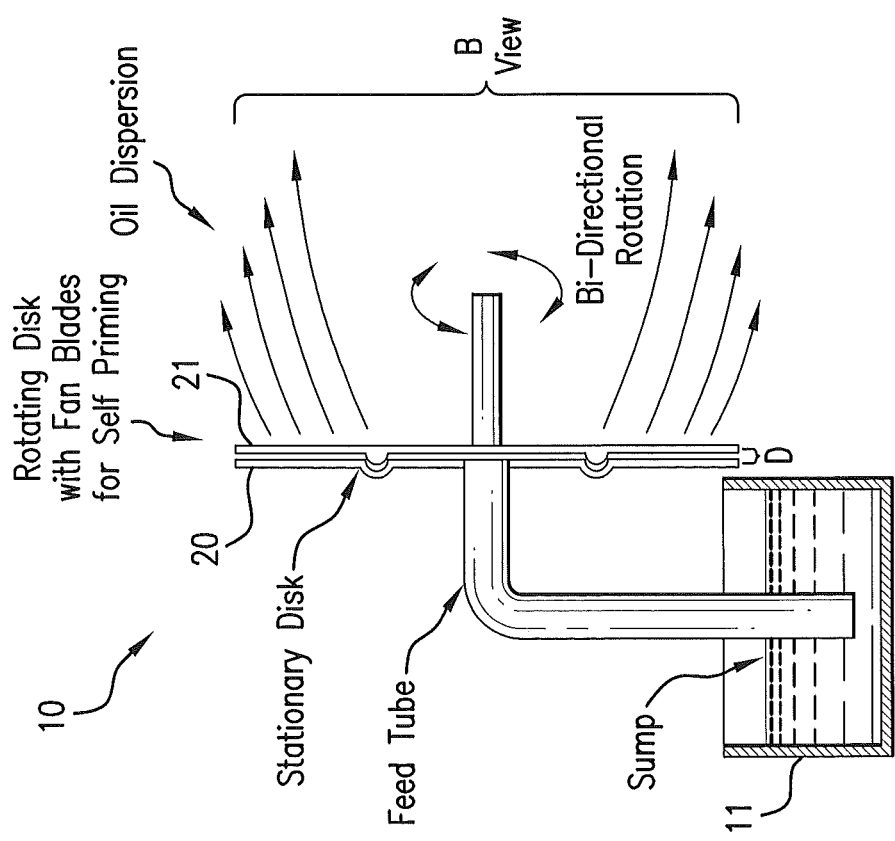

Reference may now be had to FIG. 2 depicting aspects of the oil pump 10. As shown in a cross-sectional view in FIG. 2A, the oil pump 10 includes a stationary disk 20 and a rotating disk 21 spaced a distance D from the stationary disk 20. The rotating disk 21 includes a center disk 22 and a plurality of blades or vanes 23 (such as fan-like blades or vanes) extending radially from the center disk 22. FIG. 2B illustrates a side view of the oil pump 10 showing the center disk 22 and the plurality of vanes 23 with respect to the stationary disk 21. Tips of the vanes 23 may extend beyond, be even with, or be shorter than the perimeter of the stationary disk 20.

During operation, the rotation of the center disk 22 with respect to the stationary disk 20 creates a vacuum or low pressure between the disk 20 and the disk 22 to draw oil from the oil sump 11. Oil tension between the disk 20 and the disk 22 also contributes to drawing oil. As the drawing of oil continues, the oil will flow towards the plurality of vanes 23. As the oil reaches the plurality of vanes 23, the oil will be dispersed in a 360-degree pattern by the plurality of vanes 23 about the rotational axis of the rotating disk 22. The oil is dispersed by a throwing or slinging action from each of the vanes 23. Once the initial vacuum establishes oil flow, the fluid tension action and the centrifugal forces on the oil slung out by the rotating disk 21 help to enhance the overall oil pumping action. In addition, the plurality of vanes 23 enables the oil pump 10 to be self-priming.

In addition to the 360-degree pattern, the oil can be dispersed axially along the longitudinal axis of the motor 4. This axial dispersion can be achieved by forming an angle of an end portion of some or all of the vanes 23 in relation to the rotation axis. The angle can also be varied to achieve an even axial dispersion. In lieu of or in addition to the angled vanes 23, one or more of the vanes 23 can have different lengths so that the perimeter defined by the tips of the vanes 23 is non-circular in order to alter the dispersion pattern.

Figure 3:
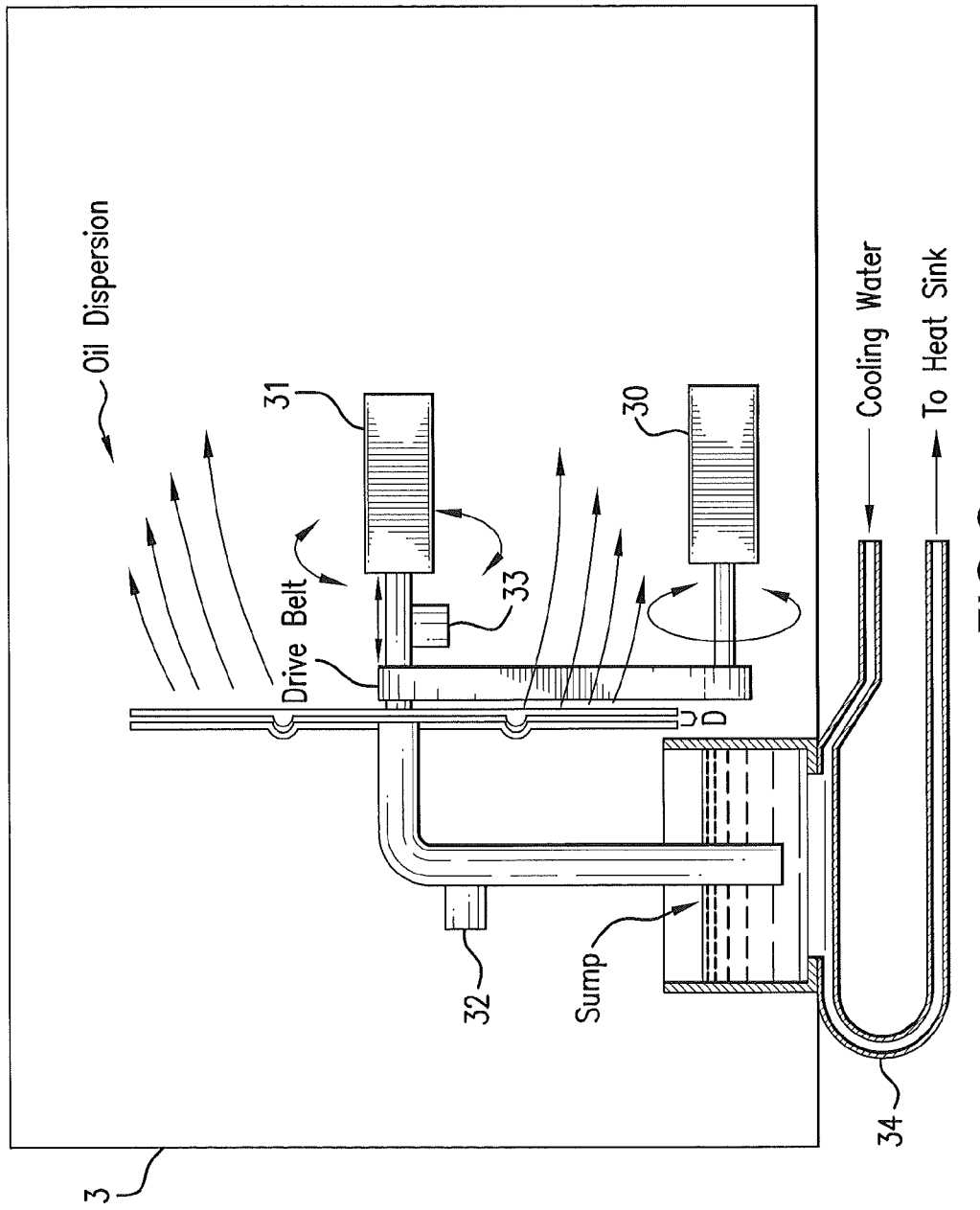
FIG. 3 depicts further aspects of the internal oil cooling pump.

The rotating disk 21 can be driven in various ways in different embodiments. In one embodiment, the rotating disk 21 is coupled coaxially to the rotor 7 and driven directly by the rotor 7. In another embodiment, the rotating disk 21 is driven indirectly by the rotor 7 such as with a configuration using gears, a chain, or pulleys and belts. In another embodiment, the rotating disk 21 is driven by an auxiliary motor 30 as shown in FIG. 3. One advantage of the auxiliary motor 30 is that the oil pump 10 can provide cooling even if the rotor 7 is stalled or turning at a slow speed. The auxiliary motor 30 in one embodiment is electrically powered.

Flow control of the oil may be provided to enable the flow of oil to be within a selected range to avoid too little flow or too much flow. Flow control may be provided by varying the speed of the auxiliary motor 30 or by varying the distance D between the stationary disk 20 and the rotating disk 21. Varying the gap between the stationary and rotating disks can be accomplished using a rotating disk actuator 31 coupled to the rotating disk 21 as shown in FIG. 3. In one embodiment, the rotating disk actuator 31 is an electric servo. An active rotating disk actuator 31 can be coupled to a flow sensor 32 and/or a speed sensor 33 to provide a feedback flow control loop. In one embodiment, the rotating disk actuator 31 is a passive device such as a spring-loaded device that pulls the disks apart at high speeds and/or at high oil pressures.

At this point it should be understood that the oil pump 10 can provide a symmetric 360-degree dispersion pattern to evenly cool the stator 5 and the plurality of stator windings 6. In one embodiment, the rotational axis of the rotor 7 is substantially the same as the rotational axis of the rotating disk 22 so that the oil dispersion pattern is symmetric within the stator 5. The symmetric cooling pattern avoids producing hot spots and, thus, reduces stresses experienced by components of the electric motor 4.

It is also understood that the electric machine system 2 may include more than one main oil pump 10. In one embodiment, the electric machine system 2 includes two main oil pumps 10 where one main oil pump 10 is disposed at one end of the rotor 7 and the other main oil pump 10 being disposed at the other end of the rotor 7 to provide even cooling.

In certain configurations, the electric machine system 2 may require a secondary oil pump to function while the rotor 7 is stalled or rotating at a very slow speed. The secondary oil pump has features similar to the main oil pump 10 depicted in FIGS. 1-3. The secondary oil pump can be electrically driven using a motor such as the auxiliary motor 30 and run whenever power is applied. Alternatively, the electrical motor driving the secondary oil pump can be switched on by the flow sensor 32 when oil flow is too low and/or by the speed sensor 33 when the rotational speed of the rotating disk 22 is too low.

Generally, when the electric machine system 2 is used in EV and HEV applications, the electric motor must rotate in both directions for forward and reverse movement. One of the advantages of the electric machine system 2 is that the oil pump 10 provides oil flow when the rotating disk 22 is rotating is either direction.

Another advantage of the electric machine system 2 is the energy required to run the oil pump 10 is minimal and mainly related to the lift and acceleration of the oil by the rotating disk 22. The oil pump 10 operates at very low pressures and has minimal oil passages, all of which can be cast or machined into a single part.

The electric machine system 2 having the oil pump 10 internal to the housing 3 lends itself to a sealed oil-cooled motor design that can utilize a secondary external cooling system 35 as shown in FIG. 3. In one embodiment, the secondary external cooling system 35 removes heat from oil in the oil sump 11 and disposes the heat in a heat sink such as a radiator. One non-limiting example of a secondary cooling medium is water. Hence, the only external connections required for the electric machine system 2 having the secondary external cooling system 35 are connections for electrical power and for the secondary cooling medium.

Figure 4:
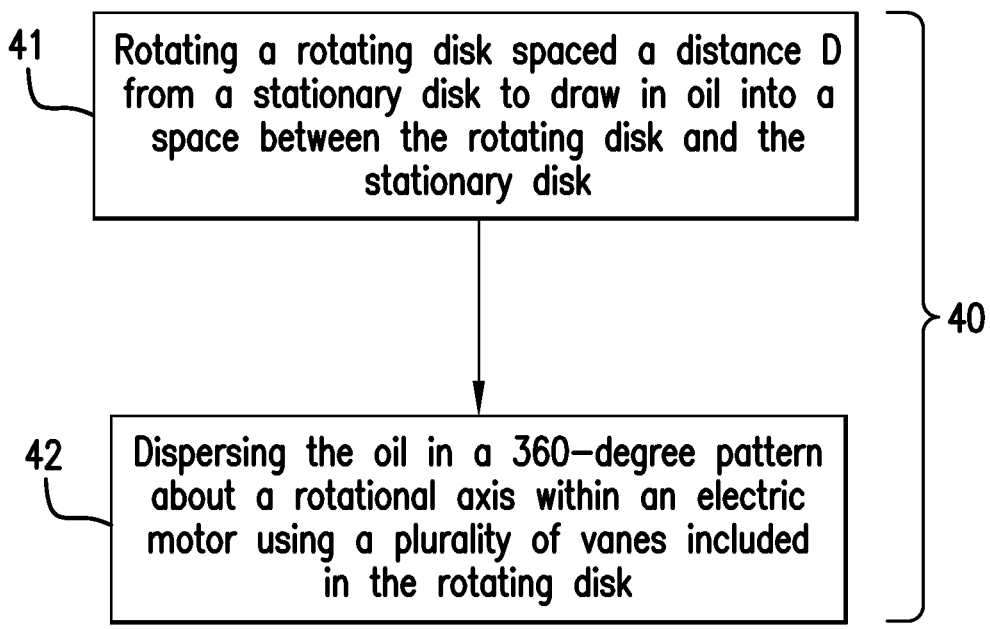
FIG. 4 presents one example of a method for operating an electric machine system having an electric motor and the internal oil cooling pump.

FIG. 4 presents one example of a method 40 for operating the electric machine system 2. The method 40 calls for (step 41) rotating the rotating disk 21 spaced a distance D from the stationary disk 20 to draw in oil into a space between the rotating disk 21 and the stationary disk 20. Further, the method 40 calls for (step 42) dispersing the oil in a 360-degree pattern about a rotational axis within the electric motor 4 using the plurality of vanes 23.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "couple" relates to one component being coupled either directly to another component or indirectly to the another component via one or more intermediate components.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed:

1. An electric machine system comprising:
   a housing;
   an electric motor disposed within the housing, the motor comprising a stator and a rotor;
   an oil pump disposed within the housing and configured to disperse oil in a pattern about a rotational axis within the electric motor, wherein the oil pump comprises a stationary disk and a rotating disk spaced a distance D from the stationary disk, the space being configured to draw in the oil from an oil sump.

2. The electric machine according to claim 1, wherein the pattern is a 360-degree pattern.

3. The electric machine system according to claim 1, wherein the housing is configured to seal the oil within the housing.

4. The electric machine system according to claim 1, wherein the rotating disk comprises a central disk and a plurality of vanes extending radially from the central disk, the plurality of vanes being configured to disperse the oil drawn into the space.

5. The electric machine system according to claim 4, wherein each vane in the plurality of vanes comprises an angle in relation to an axis of rotation.

6. The electric machine system according to claim 4, wherein a perimeter defined by an end of each vane in the plurality of vanes is non-circular.

7. The electric machine system according to claim 1, wherein the rotating disk is driven by the rotor in the electric motor.

8. The electric machine system according to claim 1, further comprising an auxiliary motor configured to drive the rotating disk.

9. The electric machine system according to claim 8, wherein the auxiliary motor is a variable speed motor.

10. The electric machine system according to claim 1, further comprising a rotating disk actuator configured to vary the distance D.

11. The electric machine system according to claim 10, wherein the rotating disk actuator comprises an electric servo.

12. The electric machine system according to claim 10, wherein the rotating disk actuator comprises a passive mechanical device.

13. The electric machine system according to claim 1, wherein the rotating disk is configured to rotate in any rotational direction to draw in the oil from the sump and to disperse the oil.

14. The electric machine system according to claim 1, further comprising a water cooling system disposed external to the housing and configured to remove heat from the oil internal to the housing.

15. The electric machine system according to claim 14, wherein the water cooling system removes heat from the oil in the oil sump.

16. The electric machine system according to claim 1, further comprising another oil pump, the another oil pump being configured to pump and disperse oil when the rotor is stopped or rotating at a slow speed.

17. The electric machine system according to claim 16, wherein the another oil pump is driven by another electric motor.

18. The electric machine system according to claim 17, the another electric motor is coupled to at least one of a speed switch sensing rotational speed of the rotor and a flow switch sensing oil flow through the main oil pump.

* * * * *